United States Patent
Cummings, III

(10) Patent No.: US 6,823,537 B1
(45) Date of Patent: Nov. 30, 2004

(54) WATER DIVERSION APPARATUS

(75) Inventor: Alexander J. Cummings, III, 320 N. Knoxville Ave., Peoria, IL (US) 61614

(73) Assignee: Alexander J. Cummings, III, Peoria, IL (US)

(*) Notice: Subject to any disclaimer, the term of this patent is extended or adjusted under 35 U.S.C. 154(b) by 0 days.

(21) Appl. No.: 10/382,301

(22) Filed: Mar. 5, 2003

(51) Int. Cl.[7] .................................................. E03C 1/00
(52) U.S. Cl. ................................................. 4/661; 4/353
(58) Field of Search ........................ 4/661, 353, 225.1

(56) References Cited

U.S. PATENT DOCUMENTS

| | | |
|---|---|---|
| 1,957,831 A | 5/1934 | Hague |
| 3,181,178 A | 5/1965 | Lerou |
| 4,364,132 A | 12/1982 | Robinson |
| D270,936 S | 10/1983 | Everson |
| 4,861,465 A * | 8/1989 | Augustyniak ............... 210/109 |
| 5,042,426 A | 8/1991 | Platt |
| 5,228,152 A * | 7/1993 | Fraley ........................... 4/664 |
| 5,671,486 A | 9/1997 | Collavo |
| 5,983,411 A | 11/1999 | Demoret |
| 6,408,450 B2 | 6/2002 | Giaimis |

* cited by examiner

Primary Examiner—Charles E. Phillips
(74) Attorney, Agent, or Firm—Husch & Eppenberger, LLC; Robert C. Haldiman; David A. Chambers

(57) ABSTRACT

A water diversion apparatus for a standard toilet tank having a fitting connected to a discharge tube and a water supply, such that the discharge tube discharges into an aesthetic container. The aesthetic container may be an aquarium or a cascade and pool. When the toilet is flushed, water is partially diverted from the toilet to the aesthetic container.

21 Claims, 4 Drawing Sheets

Fig_3.

WATER DIVERSION APPARATUS

BACKGROUND OF THE INVENTION

The present invention relates generally to water devices, and more particularly to an apparatus for partially diverting water from a toilet for use by an aesthetic container.

The bathroom is an often overlooked area of the house, especially when it comes to aesthetically pleasing furnishings. The area around the toilet is a particularly neglected area and is often reserved for air fresheners and deodorants. The related art reflects some unusual devices that serve as toilet elements and decorative combinations.

U.S. Pat. No. 5,983,411 issued to Demoret outlines the use of an aquarium that is built into the toilet tank assembly. Specifically, an aquarium is situated around the perimeter of the toilet tank, whereby fish and other freshwater creatures can comfortably live. There is also a second embodiment of this invention where an aquarium tank is built on top of the toilet tank.

U.S. Pat. No. 5,671,486 issued to Collavo outlines the use of a decorative toilet tank cover which also allows a user to more easily monitor the toilet tank fill mechanism as well as being an aesthetic improvement to the top of the tank. Molded into the tank cover are a variety of figures, with the first figure receiving discharge from the float valve vent upon the flushing of the toilet. The fluid is then directed towards an opening in the second figure, which allows the fluid to drain into the drain standpipe of the toilet.

None of the above inventions and patents, taken either singularly or in combination, is seen to describe the instant invention as claimed.

SUMMARY OF THE INVENTION

An aspect of the invention is to provide an apparatus for partially diverting water from a toilet for use by an aesthetic container.

In another aspect of the invention, there is provided an aquarium that receives water partially diverted from the toilet.

In yet another aspect of the invention, there is provided a cascade that receives water partially diverted from the toilet.

In accordance with the present invention, there is provided a water diverting apparatus including a water supply, means for partially diverting water from the water supply, an aesthetic container, such as an aquarium, for receiving the diverted water, and an outlet tube operatively connected to the aesthetic container.

According to another aspect of the invention there is provided an aesthetic device including a container for receiving water from a water supply, the container having a top and a bottom, an inlet at the top and an outlet at the bottom; means for periodically delivering water from the water supply to the inlet; an outlet tube operatively connected to the outlet and having an anti-siphoning device; and the anti-siphoning device being located at a height above the bottom of the container such that the height of the anti-siphoning device controls a level of the water in the container.

The above aspects are merely illustrative and should not be construed as all-inclusive. The aspects should not be construed as limiting the scope of the invention, rather the scope of the invention is detailed in the appended claims.

BRIEF DESCRIPTION OF THE DRAWINGS

Referring to the drawings which illustrate the best known mode of carrying out one or more embodiments of the invention.

DETAILED DESCRIPTION

Figure 1:
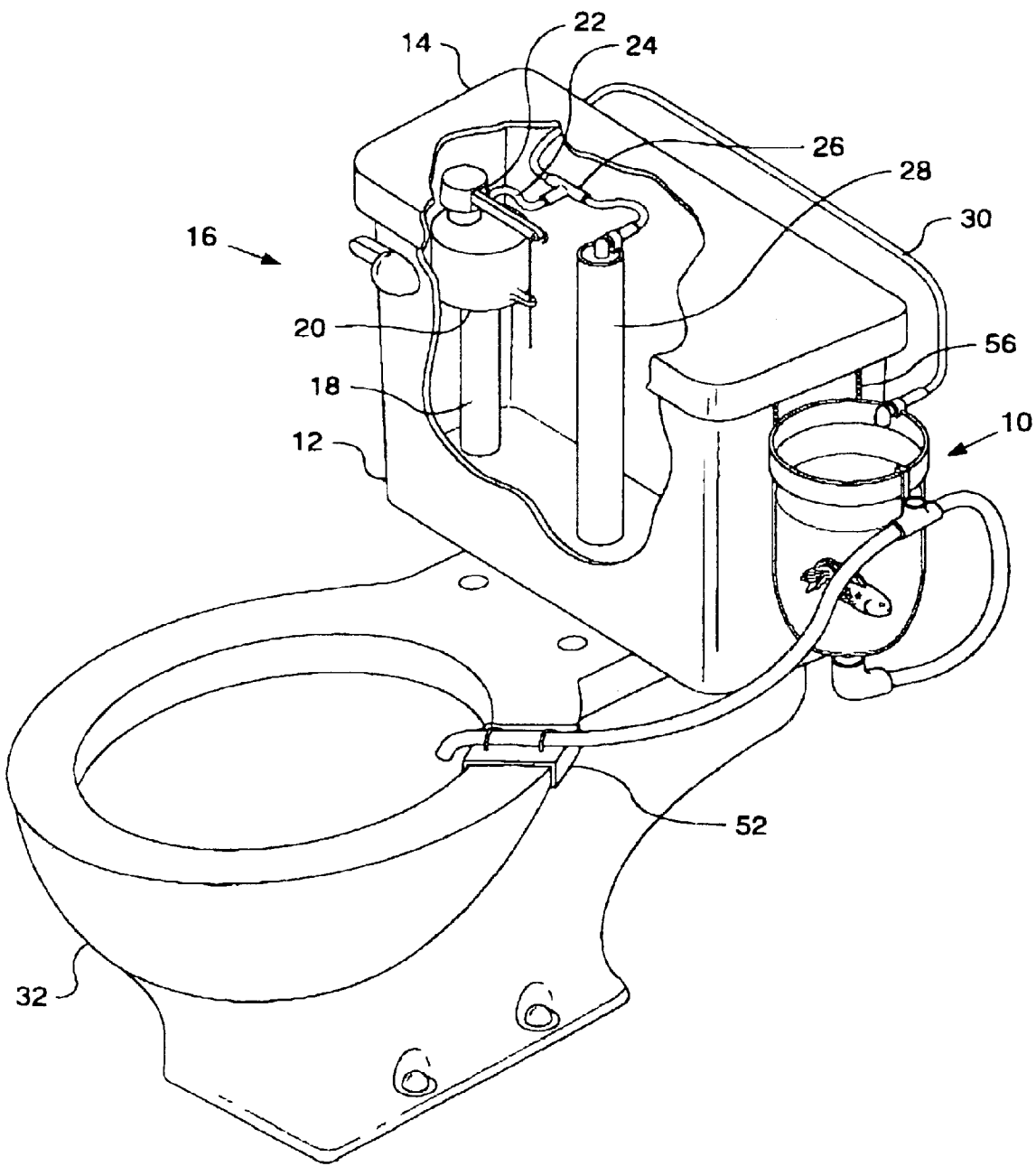
FIG. 1 is a perspective view of the preferred embodiment of the water diversion apparatus.

With reference now to FIG. 1, there is illustrated a water diversion apparatus 10. A toilet tank 12 and a lid 14 are preferably made of plastic, cast plaster, or ceramic material. When a toilet 16 is flushed, all the water leaves the tank 12, and the tank 12 must then be filled. The tank 12 is filled by water coming up through a fill standpipe 18. The water then is directed into the tank 12 by a float valve 20. The float valve 20 has a water discharge vent 22 which emits water discharge from the float valve 20. A refill tube 24 is operatively attached to the water discharge vent 22. Normally, the refill tube 24 delivers water from the float valve 20 to an overflow pipe 28; however, refill water is partially diverted by splicing a fitting 26 into the refill tube 24. In the preferred embodiment, the fitting 26 is conveniently in the shape of a "T." The fitting 26 allows refill water to flow through the refill tube 24 to the overflow pipe 28 and also allows refill water to flow through a discharge tube 30. The overflow pipe 28 is connected to a toilet bowl 32. Thus, the toilet bowl 32 is filled by the refill tube 24. With the fitting 26 connected, the refill tube 24 still fills the toilet bowl 32 with water but now a portion of the water is diverted through the discharge tube 30. The diverted water may be used by various aesthetic container apparatuses.

Figure 2:
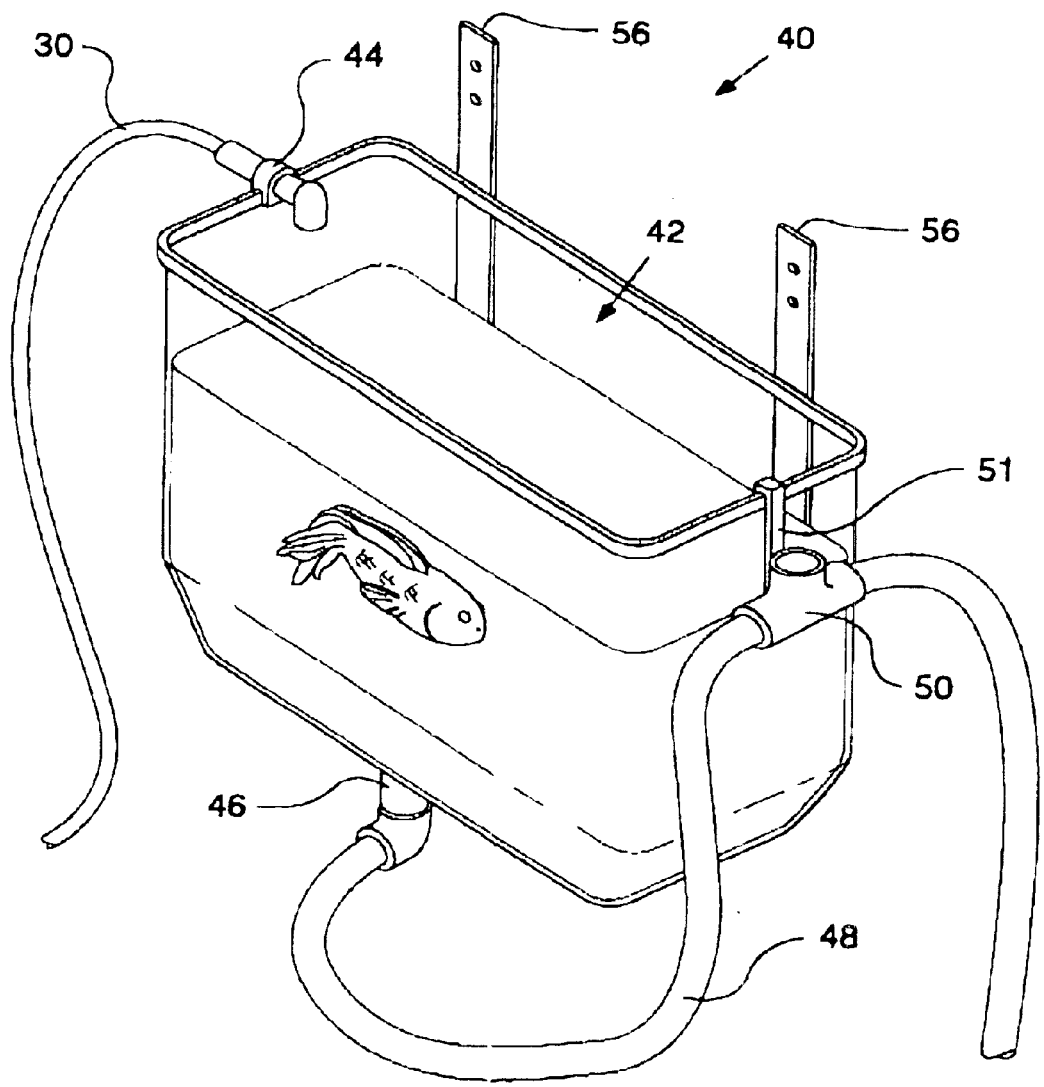
FIG. 2 is a perspective view of the preferred embodiment showing the rectangular aquarium.

FIG. 2 shows a preferred embodiment in which the aesthetic container comprises an aquarium 40 for housing various aquatic creatures but is particularly advantageous for fish. The aquarium 40 is rectangular in shape and can be made of any material impervious to water but is preferably plastic. The aquarium 40 should be transparent so fish may be seen and can be made of acrylic plastic. The aquarium 40 may be molded in one piece. In some embodiments, a decorative scenic background, such as sea weed or a sunken ship, may be painted or illustrated on one or more sides of the aquarium 40. The aquarium 40 has a top and a bottom. The top of the aquarium 40 forms an inlet 42. The discharge tube 30 is operatively connected to the inlet 42. The discharge tube 30 may be connected to the top of the aquarium 40 through the use of an inlet clamp 44. By connecting the discharge tube 30 to the inlet 42, refill water is transferred to the aquarium 40. The aquarium 40 further includes an outlet 46. In the preferred embodiment, the outlet 46 is advantageously located on the bottom of the aquarium 40. The outlet 46, however, may be placed in other locations on the aquarium 40. Further, the bottom of the aquarium 40 slopes towards the outlet 46 and all inside corners of the aquarium 40 should be rounded. In this way, debris will not build up in the corners of the aquarium 40, and all debris is channeled toward the outlet 46.

An outlet tube 48 is operatively connected to the outlet 46. The outlet tube 48 can be a hose or piping. In the preferred embodiment, the outlet tube 48 is flexible plastic hose and has a diameter larger than the discharge tube 30. The outlet tube 48 includes an anti-siphoning device 50. The anti-siphoning device 50 may include various known devices, such as a spring loaded flap but is preferably a short piece of PVC plastic piping with a hole for venting. However, the anti-siphoning device 50 may simply be a section of the outlet tube 48 being dimensioned to a significant diameter such that water flowing through the outlet tube 48 does not completely fill it, thereby preventing a siphoning effect. The water level in the aquarium 40 may be controlled by adjusting the height of the anti-siphoning device 50. This may be accomplished by a hanger 51. The hanger 51 is available in various lengths. The longer the hanger 51 length, the lower the water level. The outlet tube 48 is operatively connected to the toilet bowl 32. The outlet tube 48 may be connected to the toilet bowl 32 through the use of an outlet clamp 52 (see FIG. 1). In some embodiments, the outlet tube 48 is connected to the toilet 16 in such a way that the water may be reused. For example, the outlet tube 48 may be connected to the overflow pipe 28 or simply to the toilet tank 12.

The aquarium 40 may also be mounted on wall using brackets 56. As best seen in FIG. 1, the brackets 56 may also be used to mount the aquarium 40 to the toilet tank 12. The aquarium 40 may also be manufactured as part of the toilet tank 12 or the lid 14.

The aquarium 40 as shown in the preferred embodiment is of particular advantage in that it provides a low maintenance fish tank. The aquarium water is oxygenated and replenished by the refill water flowing in the discharge tube 30. Because the discharge tube 30 is of some height above the water level, the splashing refill water will oxygenate as it adds water to the aquarium 40. Moreover, adding fresh water causes water and debris to flow from the outlet 46 through the outlet tube 48. Thus, by flushing the toilet 16, fresh oxygenated water to is added to the aquarium 40, and waste water and debris are flushed away. The waste water and debris conveniently pass through the outlet tube 48 to the toilet. This low maintenance fish tank requires no filter system and no local electricity. It is virtually self-cleaning and serves as an aesthetic water conservation apparatus. The automatic water changing feature enables one to have a fresh, clean aquarium. It also provides a method for regulating the amount of chlorine and nitrate in the aquarium. Some of this may be accomplished by chemical additives, but the self cleaning feature is one of the things that makes this aquarium advantageous.

If too much water is added to the aquarium 40, the water will have too much chlorine and be too cold for the fish. If, however, too little fresh water is added to the aquarium, the water will be murky and contain excessive amounts of nitrate and debris. Because the fish cannot do well if too much water or too little goes into the aquarium 40, one must appropriately set the height of the anti-siphoning device 50 to properly maintain the water level in the aquarium 40 in relation to the average number of times the toilet 16 is flushed. In balancing proper water level, water temperature, water chemicals, aquarium debris, and types of aquatic life all come into play. There are a number of ways to balance these issues. One way is to adjust the overall volume the aquarium 40 holds; with a larger volume of water in the aquarium 40, any new addition of water will represent a smaller percent volume change.

Another way would be to keep the same smaller size aquarium 40, but put a smaller discharge tube 30 going into the aquarium 40 so a smaller amount of water goes in, thereby keeping the percentage change per day optimal. This might be necessary, for example, in a home with a large family that flushes the toilet 16 a lot. In a home that only flushes the toilet 16 once a day, a larger volume change per flush would be needed. That may be accomplished by having a larger discharge tube 30 going in, having a smaller volume aquarium 40 to start with, or by setting the anti-siphoning device 50 to a lower level.

Another way to keep the amount of water change per day optimized, would be to open or close a small water supply valve that feeds the tank. This may come into play if the aquarium 40 is not attached to a toilet, but is set up somewhere else that has a water supply and drain. This water inflow could be activated manually or set by a commercially available watering timer such that water is periodically delivered to the aquarium 40.

The types of aquatic life in the aquarium is another factor in selecting optimum water volume. For example, a fish that produces more waste, such as a Goldfish, needs a larger water volume change. On the other hand, a fish such as a Betta makes relatively little waste and therefore needs less water changed per period of time.

Figure 3:
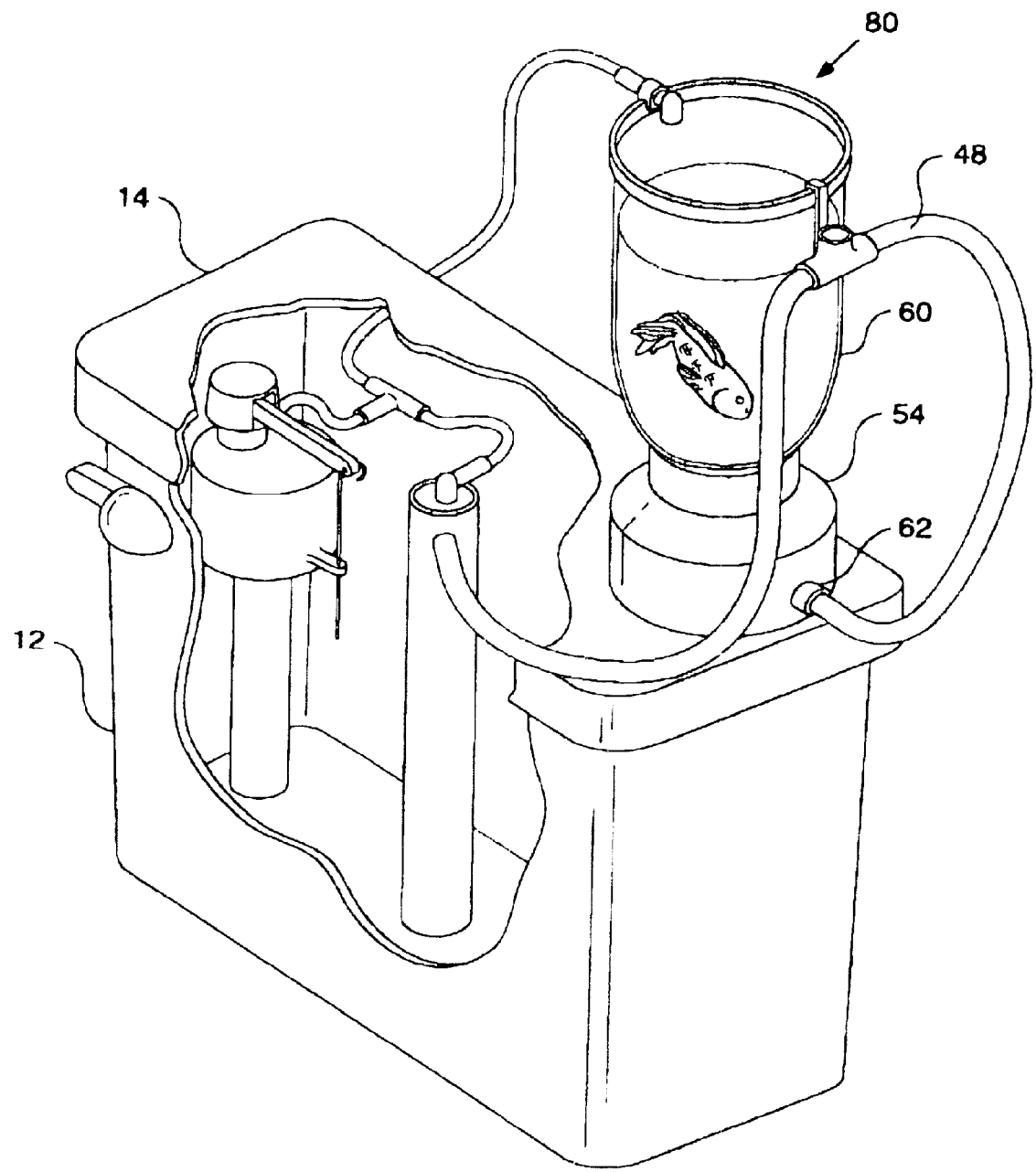
FIG. 3 is a perspective view of a second embodiment of the water diversion apparatus.

FIG. 3 illustrates another embodiment of the container in the form of an aquarium 80. In this second embodiment the aquarium 80 is cylindrical and has an aquarium base 54. The aquarium base 54 is conveniently in the form of a PVC reduction fitting, such as a three inch to one and one-half inch pipe adapter. The aquarium base 54 has a hole 62. The aquarium 80 has a bowl portion 60. The bowl portion 60 can made from a plastic two liter bottle with a neck. The neck of the bowl portion 60 is operatively connected to the aquarium base 54. The outlet tube 48 goes through the hole 62 and is operatively connected to the bowl portion 60. The aquarium base 54 is filled with a weight (not shown). In this embodiment, the weight is concrete, but other materials may be similarly suitable. The aquarium 80 may sit upon the lid 14 of the toilet 16 or upon some other item in the bathroom, such as a support stand. A support stand is generally any piece of furniture having a smooth flat slab fixed on legs. The aquarium 80 may be manufactured as part of the tank 12 or the lid 14.

Figure 4:
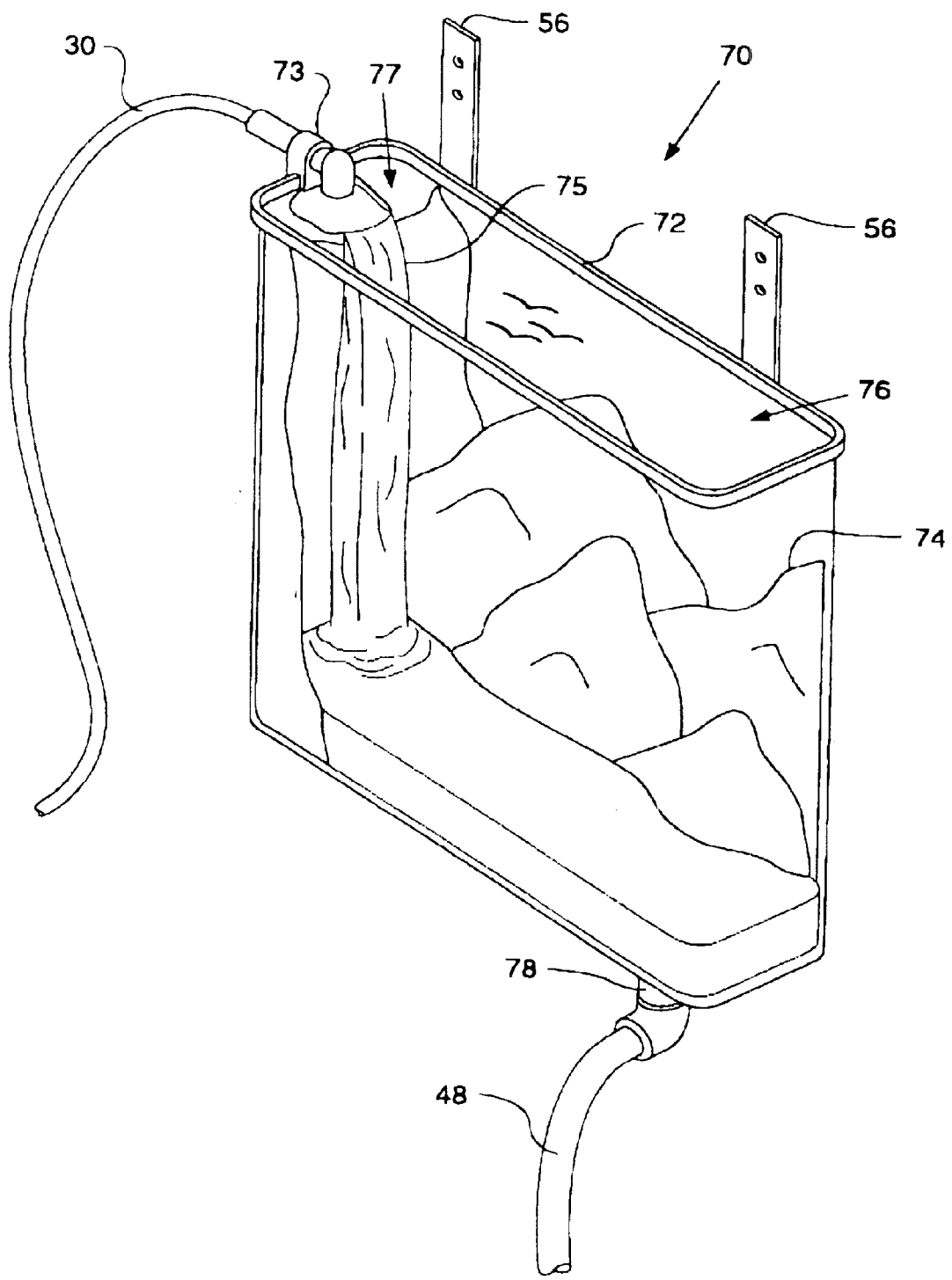
FIG. 4 is a perspective view of a third embodiment of the water diversion apparatus.

Referring now to FIG. 4, the aesthetic container is in the form of a cascade and pool 70. In this embodiment, the cascade and pool 70 includes a tank 72, an artificial landscape 74, an inlet 76, and an outlet 78. The artificial landscape 74 includes a stagnant area 77 and, in some embodiments, may include a scenic background, such as rock formations. The tank 72 may be mounted on a wall using brackets 56. The cascade and pool 70 may also be incorporated into the toilet tank 12 or the lid 14. The discharge tube 30 is operatively connected to the inlet 76. The discharge tube 30 may be connected to the cascade and pool 70 by means of an inlet clamp 73. When the toilet is flushed, water flows through the discharge tube 30 and into the inlet 76. The water puddles in the stagnant area 77 before flowing in a waterfall 75 and then pools in a bottom of the tank 72. The water level in the tank 72 may be adjusted by selecting the location of the outlet 78. The outlet tube 48 is operatively connected to the outlet 78. The outlet tube 48 is operatively connected to the toilet bowl 32. The outlet tube 48 may be connected to the toilet bowl 32 through the use of the outlet clamp 52, as shown in FIG. 1.

In some embodiments, the stagnant area 77 may be omitted such that the water merely flows over the artificial landscape 74. In other embodiments, the water will not pool in the bottom of the tank 72 but will simply drain through the outlet 78. In some embodiments, the outlet tube 48 is connected to the toilet 16 in such a way that the water may be reused.

Other aspects, objects and advantages of the present invention can be obtained from a study of the drawings, the disclosure and the accompanying claims. The invention in its broader aspects is not limited to the specific steps and apparatus shown and described but departures may be made therefrom within the scope of the accompanying claims without departing from the principles of the invention and without sacrificing its chief advantages.

What is claimed is:

1. A water diversion apparatus for a standard toilet having a fill standpipe, a float valve flushing mechanism connected to the fill standpipe and having a refill tube for delivering refill water from the standpipe to an overflow tube after flushing, comprising:
   a fitting operatively connected to a discharge tube and the refill tube, such that refill water is partially diverted by the fitting to the discharge tube;
   the discharge tube operatively connected to a container in the form of an aquarium for aquatic life, the container having an inlet, a bottom, and an outlet, the partially diverted refill water is discharged into the inlet of the container by the discharge tube; and
   an outlet tube operatively connected to the container at the outlet and including an anti-siphoning device.

2. The water diversion apparatus of claim 1, wherein the outlet is substantially in the bottom of the container.

3. The water diversion apparatus of claim 1, wherein the toilet includes a tank and the container is fluidly connected to the tank.

4. The water diversion apparatus of claim 1, wherein the container includes a scenic background.

5. The water diversion apparatus of claim 1, wherein the toilet includes a toilet lid and a base of the container is operatively engaged with the toilet lid.

6. The water diversion apparatus of claim 5, wherein the base is cylindrical.

7. The diversion apparatus of claim 1, wherein the container further includes an inlet clamp to secure the discharge tube to the container inlet.

8. The water diversion apparatus of claim 1, wherein the container further includes mounting brackets for mounting the container.

9. The water diversion apparatus of claim 1, wherein the outlet tube is operatively connected to the toilet.

10. The water diversion apparatus of claim 9, further comprising an outlet clamp to secure the outlet tube to a toilet bowl.

11. the water diversion apparatus of claim 1, wherein the container is cylindrical.

12. A water diversion apparatus for a standard toilet having a fill standpipe, a float valve flushing mechanism connected to the fill standpipe and having a refill tube for delivering refill water from the standpipe to an overflow tube after flushing, comprising:
   a fitting operatively connected to a discharge tube and the refill tube, such that refill water is partially diverted by the fitting to the discharge tube;
   the discharge tube operatively connected to an aquarium for an aquatic life, the aquarium having a bottom, an inlet, and an outlet, the outlet located substantially in the bottom, the partially diverted refill water is discharged into the aquarium at the inlet by the discharge tube;
   an outlet tube operatively connected at one end to the aquarium outlet and at the other to the toilet; and
   the outlet tube including an anti-siphoning device located at a height above the bottom, such that the height of the anti-siphoning device controls a level of refill water in the aquarium; whereby the aquatic life produces waste and upon flushing, water is partially diverted from the toilet to the aquarium, water and waste exit the aquarium at the outlet, and waste and water flow through the outlet tube into the toilet.

13. The water diversion apparatus of claim 12, wherein the toilet includes a tank and the aquarium is operatively connected to the tank.

14. The water diversion apparatus of claim 12, wherein the aquarium includes a scenic background.

15. The water diversion apparatus of claim 12, wherein the toilet includes a toilet lid and a base of the container is operatively engaged with the toilet lid.

16. The water diversion apparatus of claim 12, wherein the aquarium further includes an inlet clamp to secure the discharge tube to the aquarium inlet.

17. The water diversion apparatus of claim 12, wherein the aquarium further includes mounting brackets for mounting the aquarium.

18. The water diversion apparatus of claim 12, further comprising an outlet clamp to secure the outlet tube to a toilet bowl.

19. The water diversion apparatus of claim 12, further comprising a hanger for operatively connecting the anti-siphoning device to the aquarium.

20. The water diversion apparatus of claim 12, wherein the aquarium is rectangular.

21. The water diversion apparatus of claim 12, wherein the aquarium is cylindrical.

* * * * *